United States Patent [19]

Klebanoff

[11] 4,083,038
[45] Apr. 4, 1978

[54] CONDENSER PLATE ASSEMBLY

[75] Inventor: Leonard Klebanoff, Willowdale, Canada

[73] Assignee: Elkay Electronics Ltd., Agincourt, Canada

[21] Appl. No.: 745,843

[22] Filed: Nov. 29, 1976

Related U.S. Application Data

[63] Continuation-in-part of Ser. No. 584,741, Jun. 9, 1975, abandoned.

[51] Int. Cl.$^2$ ............................................. G08B 21/00
[52] U.S. Cl. ............................ 340/244 R; 73/304 C; 361/284; 361/306
[58] Field of Search .................... 340/244 R; 361/284, 361/306, 310; 174/117 F, 117 FF; 339/176 MF, 17 F, 21 R; 73/304 C

[56] References Cited

U.S. PATENT DOCUMENTS

| 3,102,767 | 9/1963 | Schneck | 339/17 F |
| 3,226,473 | 12/1965 | Dahlgren | 174/117 FF |
| 3,939,360 | 2/1976 | Jackson | 307/118 |

Primary Examiner—John W. Caldwell, Sr.
Assistant Examiner—Daniel Myer
Attorney, Agent, or Firm—Fetherstonhaugh & Co.

[57] ABSTRACT

A sensor and alarm device for sensing the level of a liquid in a non-conductive container, the device including a condenser plate assembly to be secured to the container for capacitive coupling to its liquid contents and further including an electronic capacitive bridge circuit connectable to said condenser plate assembly and operative to actuate an alarm circuit when the sensed level is reached by the liquid, the condenser plate assembly comprising a flexible web having adhesive on one side and having electrically conductive flexible condenser plates fixed to the other side of said web, said web and said condenser plates being folded along plural transverse lines so that one portion of the web and the plates overlap with another adjacent portion thereof to form a connector tab, and the device including a housing for containing said capacitive bridge circuit, the housing supporting multiple electrical contacts operative to mate with and grip said tab and secure the housing thereon, and the contacts providing low mutual capacity coupling between the plates and the bridge circuit.

3 Claims, 4 Drawing Figures

CONDENSER PLATE ASSEMBLY

It is a continuation-in-part application of U.S. Pat. application Ser. No. 584,741 filed June 9, 1975 now abandoned.

This invention relates to a liquid level sensor for a flowable dielectric material such as an intravenous feeding solution of the type that employs a capacitive bridge that has probe condensers mounted on the side of a container.

It is well known to sense the drop or rise of the level of liquid or the like in a closed container by means of probe condensers which have condenser plates and an open dielectric space. The basis of the detection of the level is the change of dielectric material that occupies the open dielectric space of the probe condensers. If the material changes from liquid to air, the alarm circuit in which the condenser is connected responds to the change in capacitance to give an alarm. There are many alternative alarm circuits that will respond to the change in capacitance of a capacitor when the dielectric thereof is changed from a liquid to air.

In a successful device of this type the electronics must be capable of detecting changes in capacitance of the probe capacitors of the order of one percent. With this order of sensitivity it is imperitive that stray capacitances in the system be minimized in order that reliable and consistant performance be achieved.

The containers for liquids such as intravenous feeding containers are of irregular shape. Many of them are made of a plastics material and are in the form of flexible bags. It is, therefore, not practical to make the probe condensers of rigid form and as an integral part of the electronic bridge circuit of the electronic alarm. A known condenser assembly is illustrated in the U.S. Pat. No. 3,939,360 and consists of a web of non-conducting material with electrically conducting foil condenser plates applied thereto in spaced relation to form the condenser plates of a probe condenser means. A condenser plate assembly of this form can be applied to containers of different shapes and/ or irregular shapes but it does not work very well in the electronic alarm system as a whole because of the stray capacitance between the condenser plates and the means for connecting the condenser plates into the bridge circuit of the alarm system. Prior to this invention the connection was made by means of wires that are connected with electrical contacts secured to the condenser plates as illustrated in the above noted U.S. Pat. No. 3,939,360. The stray and variable capacitances introduced into the system by means of connections of this type are of an order that seriously affect the reliability and performance of the unit as a whole.

Other arrangements are known. For example, in the U.S. Pat. No. 3,588,859 the detector bridge circuit including the probe condensers is all contained in a single housing. This overcomes the problems of stray capacitances due to connection of the probe condensers within to the bridge circuit. The difficulty with the arrangement, however, is that the housing must be made for a single container only because the contour of the face thereof upon which the probe condensers are mounted and that engages with the liquid container must follow the contour from the liquid container. This is not practical because as indicated, the shape of these liquid containers which are rigid varies and a very large proportion of the containers that are used are made from a flexible plastics material.

Thus the position prior to this invention is that the arrangement such as illustrated in U.S. Pat. No. 3,588,859 is not practical because it cannot be applied to all common types of liquid containers in use and the arrangement illustrated in U.S. Pat. No. 3,939,360 is not practical because the stray capacitances introduced into the system destroy its reliability and consistant performance.

It is, therefore, an object of this invention to provide a liquid level sensor that employs an electronic alarm circuit that can be used on all types of practical containers and that is reliable.

With these and other objects in view, a liquid level sensor according to this invention comprises a liquid level sensor comprising an electronic alarm circuit; said electronic alarm circuit including a condenser plate assembly; said condenser plate assembly comprising a flexible web of a non-conducting material, electrically conducting condenser plates overlying said web in spaced relation to each other to form a probe condenser means with an open dielectric space; said web and said electrically conducting condenser plates being folded to cause a portion of each of said condenser plates to be in upstanding relation with respect to the portion immediately adjacent thereto whereby to form a connector tab; said web of non-conducting material having an adhesive thereon whereby said web is mountable on the wall of a container for a flowable dielectric material; said electronic alarm circuit having a capacitive bridge which includes said probe condenser means and that is responsive to liquid level at said probe condenser means to operate said electronic alarm circuit; said capacitive bridge having a low capacitance electrical contact adapted to engage directly with said electrically conducting condenser plates of said probe condenser means at said connector tab whereby to connect said condenser plates into said capacitive bridge; the elements of said capacitive bridge being in close physical relationship to said low capacitance electrical contact; and a housing for the elements of said capacitive bridge except said probe condenser means, said low capacitance electrical contact being mounted on said housing.

The invention will be clearly understood after reference to the following detailed specification read in conjunction with the drawings.

Figure 1:
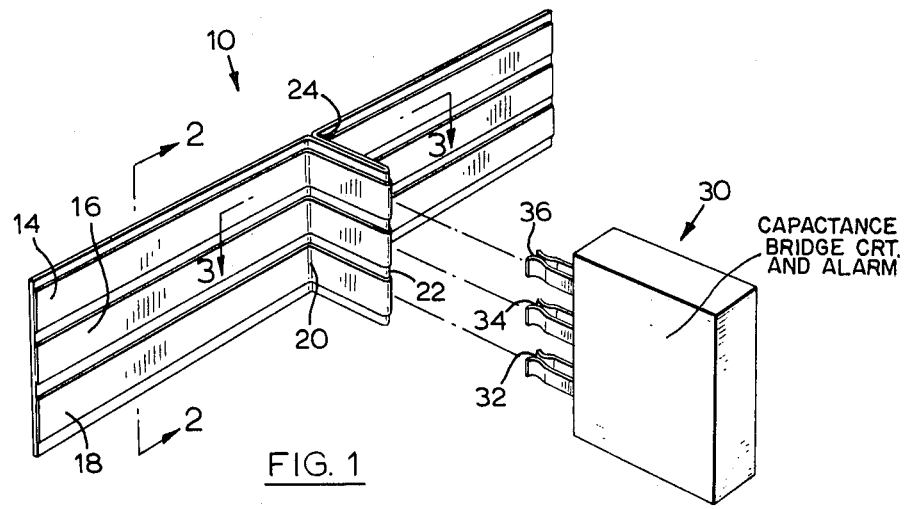
FIG. 1 is a perspective view of a condenser plate assembly and an alarm circuit assembly connectable thereto.

Referring to the drawings, the numeral 10 generally indicates a condenser plate assembly for a capacitance bridge of an electronic alarm circuit. It comprises a web of non-conducting material 12 such as paper upon which is mounted three electrically conducting metallic foil condenser plates 14, 16 and 18. The condenser plates are spaced apart in vertical relation so that a condenser with an open dielectric space is formed between the plates 14 and 16 and a condenser with an open dielectric space is formed between the plates 16 and 18. In use, these two condensers with their open dielectric spaces are connected to the capacitance bridge circuit of an electronic alarm circuit.

This invention is concerned with the formation of the condenser plate assembly and its connection into the capacitance bridge of the alarm circuit and it will be noted that the web illustrated is formed with three spaced apart fold lines 20, 22 and 24 so that the web can be folded upon itself to form a two ply tab portion as illustrated.

Figures 2, 3:
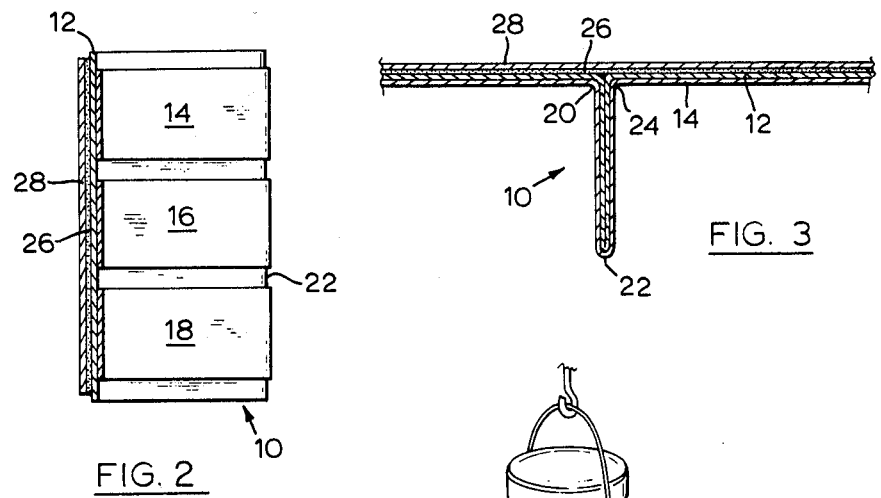
FIG. 2 is a view along the line 2—2 of FIG. 1.
FIG. 3 is a partial view from the upper end of FIG. 1.

A pressure sensitive adhesive 26 is applied to the other side of the web and preferably a release layer 28 is applied over the pressure sensitive adhesive after the tab has been formed. The condenser plate assembly is preferably manufactured and shipped as illustrated in FIGS. 1, 2 and 3.

Figure 4:
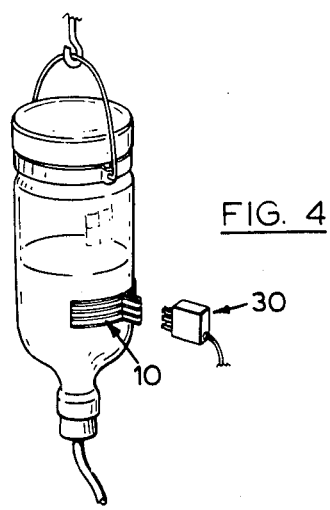
FIG. 4 is a view of the assembly on a bottle of liquid and showing an alarm circuit assembly in position for securement to the tab connectors thereof.

When it is desired to use the assembly in an alarm circuit, one removes the release strip 28 and applies the assembly to the outside of a bottle with the longitudinal axis of the condenser plates 14, 16 and 18 extending horizontally across the bottle as illustrated in FIG. 4. In this position, the composite tab formed by the two plies of web as described above extends outwardly of the bottle container and the plate condensers of the assembly are connected to the capacitance bridge circuit of the alarm which is contained in the housing generally indicated by the numeral 30 by slipping the spring loaded circuit contacts 32, 34 and 36 over the tab portions of the condenser plates 18, 16 and 14 respectively so that they directly engage with the condenser plates.

The connection between the electronic circuit and the condenser plates is effected through the contacts 32, 34 and 36 and it is of a surface pressure nature. The electronics of the alarm circuit are not part of this invention except to the extent that they must contain a capacitance bridge of which the capacitors of the web assembly are a part. Examples of suitable circuitry are shown in U.S. Pat. Nos. 3,588,859, 3,939,360 and 4,002,996. A capacitor is formed between plates 14 and 16 and a capacitor is formed between plates 16 and 18. In use the dielectric for these capacitors consists of the contents of the bottle at their respective levels. As the liquid level in the bottle 10 drops, capacitance of one condenser changes with respect to the capacitance of the other and the bridge balance is disturbed to cause an alarm to be given. This general method of providing for an alarm in response to changing capacitance under these conditions is known and is not part of this invention.

It is, however, important to this invention that the bridge circuit for the alarm circuit apart from the probing condensers be physically close to the probing condensers on the side of the bottle and that the coupling to the capacitance bridge be a low capacitance and constant capacitance coupling. It will be noted that the tab contact provides a low capacitance direct connection between the condenser plates of the sensing capacitors and slide contact. Further the mounting of the elements of the bridge apart from the sensing capacitors in the same housing that carries the connectors 36 again gives a constant and low capacitance coupling between he connectors and the capacitance bridge.

The construction as a whole achieves the objects of the invention and represents a substantial advance in the art of liquid level sensors.

The housing 30 in the embodiment illustrated contains the bridge circuit and the alarm that is responsive to the operation thereof upon the changing of capacitance due to level change in the bottle, the circuitry being shown in my U.S. Pat. No. 4,002,996. However, it is not necessary that all of the alarm circuit be contained within the housing. The important thing is that the capacitance bridge elements apart from the probe condensors which are mounted on the tab should be physically close to the connectors. The actual alarm such as a bell or light can be external to the bridge circuit. As indicated in the preamble it is important that stray capacitances be small and that they be constant. This is achieved in this invention by providing for the housing of the connectors and the bridge elements in a common unit and by providing a tab connector on the strip of web material that can be directly engaged by the connector.

In use, the capacitance between the condenser plates changes as the level of the liquid rises or falls and this change in capacitance is communicated to the alarm circuit through the tab connectors and the pressure contact with the tabs.

A two ply tab formed by three folds has been illustrated. Other tab configurations are possible. One could, for example, cut off the outer end of the two ply tab to form two electrically independent tabs in back to back relation with double the number of condensers. One could also form a tab by merely folding the end portion of a strip. Moreover, the portions of the two ply tab that abut each other could be adhesive coated. Many variations of the inventive concept are possible.

The embodiments of the invention in which an exclusive property or privilege is claimed are defined as follows:

1. A condenser plate assembly for an electronic alarm circuit of a liquid level sensor comprising:
   a web of flexible non-conducting material;
   electrically conducting condenser plates in the form of elongated strips of foil material disposed along the length of the web in parallel relation to each other and secured to said web to form probe condenser means with an open dielectric space between adjacent strips;
   said web and secured condenser plates being folded to cause a portion of each condenser plate to be in upstanding relation with respect to the portion immediately adjacent thereto, said upstanding portion being a connector tab; and
   said web having an adhesive on the opposite face to said condenser plates and being mountable on the wall of a container for a flowable dielectric material.

2. An improved sensor and alarm device for sensing the level of a liquid in a non-conductive container, the device including a condenser plate assembly to be secured to the container for optimal capacitive coupling to its liquid contents and further including an electronic capacitive bridge circuit connectable to said condenser plate assembly and operative to actuate an alarm circuit when the sensed level is reached by the liquid, the improvement comrpising:
   in said condenser plate assembly a flexible web of non-conducting material having adhesive on one side for securing the web to follow the surface contour of the container, and multiple electrically conductive flexible condenser plates fixed to the other side of said web and extending along the web in mutually transversely spaced relationship, said web and said condenser plates being folded along plural transverse lines so that one portion of the web and the plates overlap with another adjacent portion thereof to form a connector tab extending in upstanding relationship with respect to a remaining portion of the web which is secured to the container; and a cooperative connector and circuit means including a housing for containing said capacitive bridge circuit, the housing supporting multiple electrical contacts disposed in mutually transversely spaced relationship and operative to mate with and grip said tab and secure the housing thereon, and each contact being located respectively to align with and connect to one of said condenser plates, the contacts being coupled within the housing to the bridge circuit which is located in close proximity to the contacts, and the contacts providing low mutual capacity coupling between the plates and the bridge circuit.

3. A liquid level sensor as claimed in claim 2 in which said condenser plates are made of metal foil and said web is folded at three spaced apart locations, one being mid-way between the other two whereby to form said connector tab as a two-ply tab.

* * * * *